US009739887B2

United States Patent
Small

(10) Patent No.: US 9,739,887 B2
(45) Date of Patent: *Aug. 22, 2017

(54) METHOD AND APPARATUS FOR FORMING A BEAM

(71) Applicant: David Small, Numeralla (AU)

(72) Inventor: David Small, Numeralla (AU)

(73) Assignee: Locata Corporation Pty Ltd, Griffith, ACT (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,903

(22) Filed: Aug. 2, 2016

(65) Prior Publication Data

US 2017/0068000 A1    Mar. 9, 2017

Related U.S. Application Data

(63) Continuation of application No. 14/557,412, filed on Dec. 1, 2014, now Pat. No. 9,444,539, which is a (Continued)

(30) Foreign Application Priority Data

Jul. 1, 2009 (AU) ............... 2009903063

(51) Int. Cl.
    *G01S 19/22*     (2010.01)
    *G01S 19/36*     (2010.01)
    (Continued)

(52) U.S. Cl.
    CPC ............ *G01S 19/22* (2013.01); *G01S 19/36* (2013.01); *H01Q 1/48* (2013.01); *H01Q 3/36* (2013.01);
(Continued)

(58) Field of Classification Search
CPC ......... G01S 19/22; G01S 19/36; H01Q 21/00; H01Q 3/36; H01Q 9/42; H01Q 1/48; H01Q 25/00; H01Q 3/42
See application file for complete search history.

(56) References Cited

U.S. PATENT DOCUMENTS 3,319,249 A    5/1967   Blachier et al.
5,103,232 A    4/1992   Chang et al.
(Continued)

FOREIGN PATENT DOCUMENTS

JP     2003-023383 A    1/2003
JP     2004-317524 A   11/2004
(Continued)

*Primary Examiner* — Lewis West

(57) ABSTRACT

A device for forming a beam of an antenna array, the device including: an antenna array having a plurality of spatially distributed elements; a processor for selectively switching said elements between first and second states wherein, in said first state, said elements are configured to receive an incoming signal; and a receiver operatively associated with said antenna array and said processor for generating a reference signal, mixing said incoming signal with a modified reference signal to generate a mixed signal and summing the mixed signal over a predetermined period to generate an accumulated signal, wherein said reference signal is modified prior to being mixed with said received signal such that said accumulated signal is indicative of the direction and magnitude of the beam of the antenna array.

21 Claims, 5 Drawing Sheets

Related U.S. Application Data continuation of application No. 13/377,808, filed as application No. PCT/AU2010/000839 on Jul. 1, 2010, now Pat. No. 8,934,844.

(51) Int. Cl.

| | | |
|---|---|---|
| *H04B 7/08* | (2006.01) | |
| *H04Q 1/48* | (2006.01) | |
| *H01Q 9/42* | (2006.01) | |
| *H01Q 21/00* | (2006.01) | |
| *H01Q 3/36* | (2006.01) | |
| *H01Q 3/42* | (2006.01) | |
| *H01Q 25/00* | (2006.01) | |
| *H01Q 1/48* | (2006.01) | |

(52) U.S. Cl.
CPC ............... *H01Q 3/42* (2013.01); *H01Q 9/42* (2013.01); *H01Q 21/00* (2013.01); *H01Q 25/00* (2013.01); *H04B 7/08* (2013.01)

(56) References Cited

U.S. PATENT DOCUMENTS

| | | |
|---|---|---|
| 5,268,695 A | 12/1993 | Dentinger et al. |
| 6,005,515 A | 12/1999 | Allen et al. |
| 6,411,612 B1 | 6/2002 | Halford et al. |
| 6,784,838 B2 | 8/2004 | Howell |
| 6,828,935 B1 | 12/2004 | Dunn et al. |
| 6,870,503 B2 | 3/2005 | Mohamadi |
| 6,928,275 B1 | 8/2005 | Patrick et al. |
| 7,786,933 B2 | 8/2010 | Chang |
| 8,934,844 B2 * | 1/2015 | Small .................... G01S 19/22 455/562.1 |
| 9,444,539 B2 * | 9/2016 | Small .................... G01S 19/22 |
| 2001/0050632 A1 | 12/2001 | Kawanabe |
| 2002/0002065 A1 | 1/2002 | Mesecher et al. |
| 2002/0041252 A1 | 4/2002 | Gronemeyer |
| 2002/0111149 A1 | 8/2002 | Shoki |
| 2006/0044199 A1 | 3/2006 | Furuhi et al. |
| 2006/0227905 A1 | 10/2006 | Kunysz et al. |
| 2008/0150794 A1 | 6/2008 | Suzuki |
| 2009/0147835 A1 | 6/2009 | Hollreiser et al. |

FOREIGN PATENT DOCUMENTS

| | | |
|---|---|---|
| JP | 2006-345426 | 12/2006 |
| JP | 2007-028089 A | 2/2007 |
| WO | 0297469 A1 | 12/2002 |

* cited by examiner

METHOD AND APPARATUS FOR FORMING A BEAM

RELATED APPLICATIONS

This application is a continuation of U.S. patent application Ser. No. 14/557,412, filed Dec. 1, 2014, which is a continuation of U.S. patent application Ser. No. 13/377,808, filed Dec. 12, 2011, now U.S. Pat. No. 8,934,844, which is a 371 of International Application No PCT/AU2010/000839, filed Jul. 1, 2010, which claims priority to Australian Patent Application No 2009903063, filed Jul. 1, 2009. The entire disclosures of these applications are incorporated herein by reference.

FIELD OF THE INVENTION

The present invention relates generally to positioning systems and in particular to subsystems for receiving positioning signals.

The invention has been developed primarily for forming a beam for receiving positioning signals in a multipath environment and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

As is known in the art, positioning technologies generally operate by measuring the time a signal takes to traverse from a signal source to the receiving device. In most prior art applications, this measurement is taken by comparing the time at which a signal is sent with the time at which the same signal is received. Common positioning systems such as GPS use three or more such signals and, using trilateration, calculate an object's position. Since the measurement calculations are time-sensitive, a fourth signal is commonly required to ensure that the clocks of the source and the receiver are properly synchronised.

Multipath refers to the phenomenon whereby positioning signals are reflected off other objects, such as walls and furniture. This is especially prevalent in an enclosed environment, such as indoors, but is also a significant problem in built up areas, such as in cities. Simplistically speaking, reflected signals take longer to traverse from a source to a receiver, therefore affecting the accuracy of the measurements. Also the receiver sees conflicting signals originating from the same source, having different timing information. Some modern receivers use selection algorithms to try to determine the most appropriate signal to use in position determination. However, receivers typically cannot differentiate multipath signals from the genuine positioning signals to any high degree of accuracy.

Also known in the art are phased arrays, consisting of a number of antenna elements that can be individually controlled to direct a beam. In a typical phased array, signals received at each element are individually phase and gain manipulated, the exact manipulation required depending on the direction of the beam required. The resulting phase and gain manipulated signals from each element are then summed to obtain the desired direction of the beam.

There are three main forms of phased array antennas in use today:

a) fixed beam forming;
b) sequential beam forming; and
c) simultaneous beam forming.

Fixed beam forming antenna arrays have a fixed phase relationship between the elements and can only direct their beam in a single direction. Since the direction of the beam is fixed, this type of antenna cannot be used individually to track a moving signal source in a positioning system, such as a satellite in a GPS application. A fixed beam forming antenna must be used in conjunction with some mechanical means to steer the beam to the transmission source. Aside from reliability issues related to long term use of mechanical equipment, this mechanical movement must be coordinated with the direction in which the beam is pointed. This adds an additional source of potential error.

Sequential beam forming phased array antennas use discrete phase and gain circuitry attached to each element to form beams sequentially in multiple directions. Discrete circuitry is required because each element must be individually controlled. Therefore, each element must have access to its own suite of electronics, such as phase shifters, variable gain amplifiers, and associated control signals. Apart from the additional costs arising for all the required discrete circuitry, and the problems introduced in controlling this circuitry with the precision required, this method is severely constrained when used in positioning systems because only a single beam can be directed at a time. As noted above, positioning systems such as GPS require the tracking of at least three signals, and to get the most accurate results these signals should be tracked simultaneously. Sequential beam forming phased arrays are therefore not suitable for use in positioning systems because they cannot track more than one signal simultaneously.

Simultaneous beam forming phased array antennas are also widely in use. Traditional simultaneous beam forming antennas use large arrays of elements with complex circuitry to simultaneously form beams in multiple directions. These arrays require RF front ends and analogue-to-digital converters for each element, and a very complex array of digital logic in the baseband to combine all the element signals together. The size, power consumption, and cost of such arrays limit their use to very large installations typically using hundreds of elements, for example in military applications. Clearly, the size, complexity, power consumption and cost of these systems make them unsuitable for use in positioning systems.

Additionally for positioning systems using interferomic techniques, any line biases or group delays introduced by the large scale parallel processing of traditional simultaneous beam forming antenna arrays cannot be tolerated. All these errors must be estimated and calibrated out of the system for centimeter positioning accuracies to be achieved. This is a non-trivial problem as these biases will change with circuit temperature, voltage, and component tolerances. Again, this makes traditional simultaneous beam forming antenna arrays unsuitable for use in high precision positioning systems.

SUMMARY OF THE INVENTION

It is an object of the present invention to overcome or ameliorate at least one of the disadvantages of the prior art, or to provide a useful alternative.

It is a further object of the present invention to create multiple beams simultaneously.

It is a further object of the present invention to use a single RF front end for simultaneously forming the multiple beams.

It is a further object of the present invention to form relatively narrow beams using relatively large numbers of elements (generally more than 32 elements), whilst minimizing electronic complexity.

It is a further object of the present invention to re-use standard positioning receiver components/logic blocks to reduce power consumption, cost and complexity.

It is a further object of the present invention to provide a method of simultaneously forming multiple beams in different directions using relatively large numbers of elements (generally more than 32 elements) for positioning systems, whist obviating the need for complicated circuitry and calibration.

According to an aspect of the invention, there is provided a device for forming a beam of an antenna array, the device including:
 an antenna array having a plurality of spatially distributed elements;
 a processor for selectively switching said elements between first and second states wherein, in said first state, said elements are configured to receive an incoming signal; and
 a receiver operatively associated with said antenna array and said processor for generating a reference signal, mixing said incoming signal with a modified reference signal to generate a mixed signal and summing the mixed signal over a predetermined period to generate an accumulated signal, wherein said reference signal is modified prior to being mixed with said received signal such that said accumulated signal is indicative of the direction and magnitude of the beam of the antenna array.

Preferably, the receiver includes at least one receive channel having a correlator, wherein the operative association with the antenna array is provided by the correlator. The operative association between the antenna array and the correlator is preferably provided by selectively manipulating the phase and/or gain of the reference signal in substantial synchronisation with an element being switched to the first state. The manipulation of the phase and/or gain is preferably achieved by respectively applying a phase and/or gain offset to the reference signal, wherein the value of the phase and/or gain offset is determined in dependence upon one of the elements being switched to the first state.

Preferably, the correlator includes a carrier numerical control oscillator (NCO) and the reference signal is synthesised in the carrier NCO.

The value of the phase and/or gain offset is, in one embodiment, determined by the processor in real time. Alternatively, the value of the phase and/or gain offset is determined by retrieving a predetermined value stored in a database that is accessible by the processor.

Preferably, in the first state, the element is active and in the second state, the element is inactive. The elements are preferably switched between the first and second states in a predetermined sequence. The predetermined sequence preferably selectively excludes one or more elements from being switched to the first state.

Preferably, the configuration of the antenna array is dynamically adjustable by switching one or more elements to the second state for the entire duration of said integration period.

The elements are preferably switched to the first state for a sub-integration period, wherein the sub-integration period is less than the predetermined integration period.

Preferably, the predetermined integration period includes a plurality of beam forming slots (B-slots). An element is preferably switched to the first state for the entire duration of the B-slot.

In one embodiment, each B-slot is configured to access a respective accumulator for storing the incoming signal and wherein each respective accumulator is mixed with the modified reference signal to generate the mixed signal.

Preferably, each B-slot within an integration period is dynamically adjustable such that one or more elements are selectively excluded from being switched to the first state.

The elements are preferably spatially distributed in a three dimensional configuration such that the device can form beams in one or more dimensions.

Preferably, each receiver includes multiple receive channels and wherein each receive channel is adaptable to form at least one beam.

Elements switched to the second state are preferably configured to be non-resonant such that the effects of mutual-coupling are ameliorated.

A propagation delay is incurred between receiving the incoming signal and mixing the incoming signal, the propagation delay preferably being accounted for by delaying the modification of reference signal.

According to an aspect of the invention, there is provided a method for forming a beam of an antenna array, the method including the steps of:
 a) selectively switching spatially distributed elements of said antenna array from a second state to a first state, wherein, in said first state, said elements are configured to sample an incoming signal;
 b) receiving, at said elements switched to said first state, an incoming signal;
 c) generating, in a correlator, a reference signal for correlation with said incoming signal;
 d) applying, in substantial synchronisation with said elements being switched to said first state, a predetermined offset to said reference signal to create a modified reference signal;
 e) mixing said incoming signal with said modified reference signal to create a mixed signal; and
 f) accumulating said mixed signal over an integration period to create an accumulated signal, wherein said accumulated signal is indicative of the direction and magnitude of said beam of said antenna array

BRIEF DESCRIPTION OF THE DRAWINGS

A preferred embodiment of the invention will now be described, by way of example only, with reference to the accompanying drawings in which.

PREFERRED EMBODIMENT OF THE INVENTION

System Overview

According to the invention, there is provided a device and method for forming a beam of an antenna array in the direction of an incoming positioning signal. Since the direction of the source of the positioning signal is predetermined, the beam of the antenna array is formed in the direction of the incoming positioning signal, maximising the gain of that incoming positioning signal while attenuating signals from other directions, thereby mitigating any unwanted effects of multipath.

Figure 1:
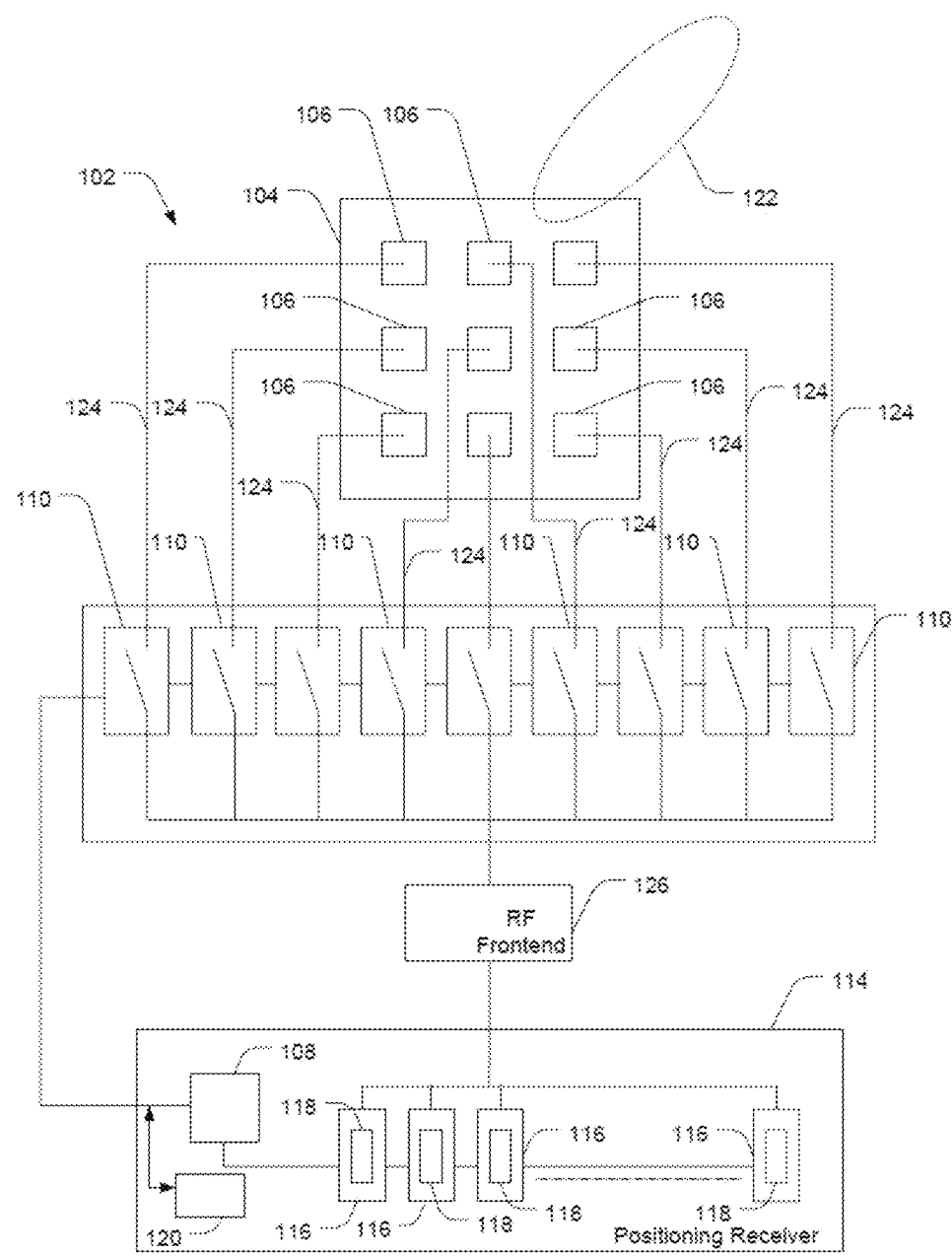
FIG. 1 is a schematic view of an antenna array coupled with a positioning receiver according to one aspect of the invention.

Referring to FIG. 1, a device 102 for forming a beam in an antenna array includes the antenna array 104, which has a plurality of spatially distributed elements 106. A processor 108 is coupled to the antenna array 104 for selectively switching, via switches 110, the elements 106 between first and second states in a predetermined pattern wherein, in the first state, the elements are configured to receive an incoming positioning signal and in the second state elements are configured to not receive incoming positioning signals.

A positioning receiver is operatively associated with the antenna array and the processor for generating a reference signal, and is provided by selectively manipulating the phase and/or gain of the reference signal in substantial synchronisation with each element being switched to its respective first state. This creates a modified reference signal which is then mixed with the received positioning signal to create a mixed signal. This mixed signal is then accumulated over a predetermined integration period, such that the accumulated signal is indicative of the direction and magnitude of the beam of the antenna array.

In one embodiment, discrete components/logic blocks are used in a circuit utilizing mixers, oscillators and accumulators to produce the requisite accumulated signals before passing onto a positioning receiver for subsequent processing.

Figure 4:
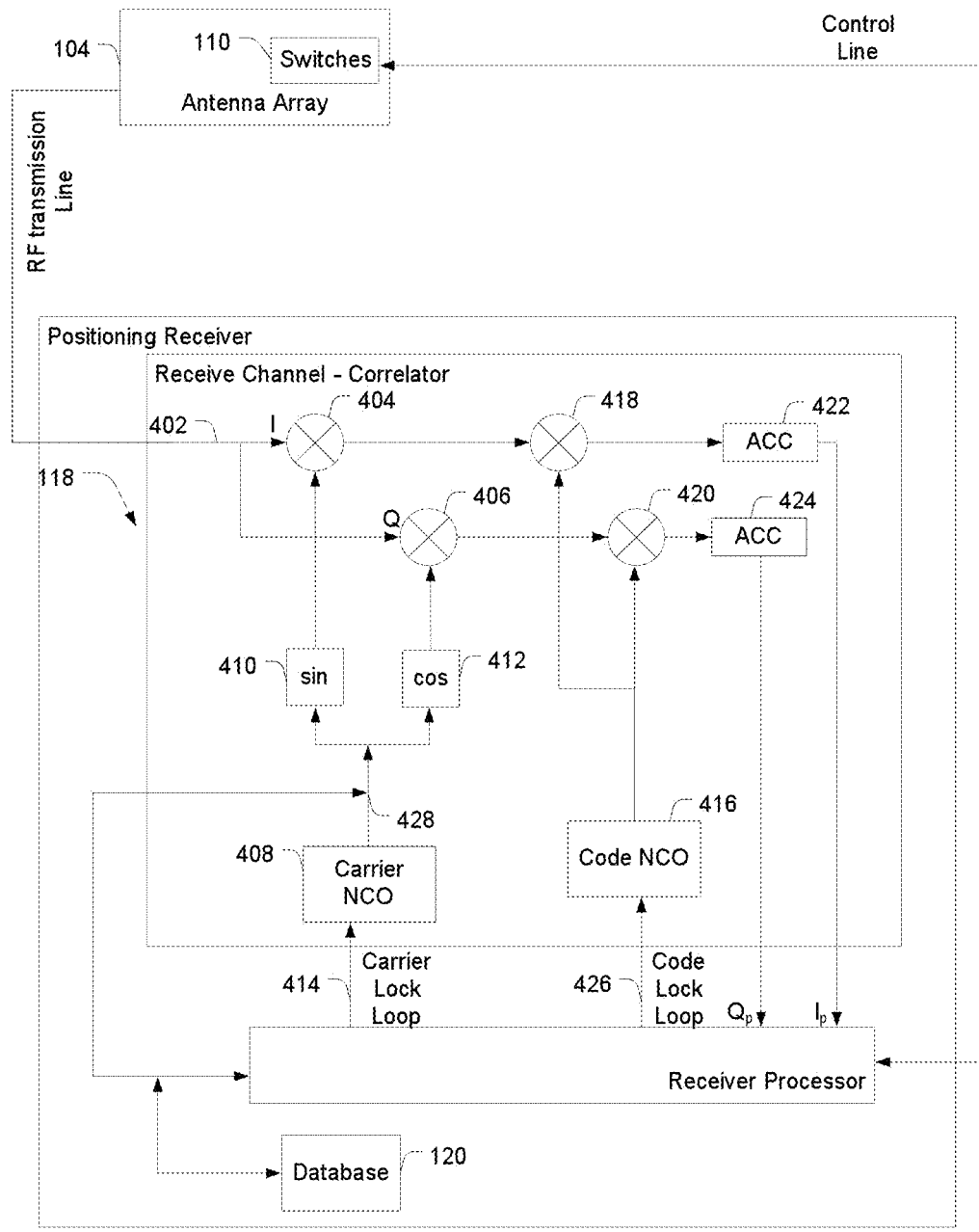
FIG. 4, is a schematic view of a modified correlator according to one aspect of the invention.

However, the preferred embodiment is to incorporate the beam forming method of the present invention into a standard positioning receiver, as shown in FIG. 4. This is because much of the required circuitry for forming beams according to the present invention is already part of standard positioning receiver architecture, and only requires minor modification to allow the formation of simultaneous beams. This required circuitry is embodied in the correlator which, as those skilled in the art would understand, includes mixers, oscillators and accumulators. These components of the correlator can be utilised in lieu of discrete components. This provides benefits such as cost and power savings, as well added benefits in miniaturisation, integration and portability of the receiver device.

Referring again to FIG. 1, a positioning receiver 114 used in a positioning system is depicted according to the preferred embodiment. The positioning receiver 114 makes use of existing components including at least one receive channel 116 having at least one correlator 118 that is operatively associated with the antenna array 104 and the processor 108. Each correlator 118 incorporates a carrier numerically controlled oscillator (NCO) for generating a reference signal. This reference signal can have its phase and/or gain modified by the processor 108 in substantial synchronism with each element being switched to its first state, thus creating a modified reference signal. The received positioning signal is subsequently mixed with this modified reference signal to create a mixed signal. This mixed signal is then mixed with a code NCO reference signal, as per standard correlator processing, and subsequently accumulated over a predetermined integration period to create an accumulated signal. The resulting accumulated signal is therefore indicative of the direction and magnitude of a beam 122 formed within the correlator 118 from the antenna array 104. At the end of each predetermined integration period the correlator lock loops operate, as per normal correlator operation, unperturbed by the phase and/or gain manipulations.

Modification of the Reference Signal

After the reference signal is synthesised by the carrier NCO, it is modified by selectively manipulating the phase and/or gain of the reference signal in substantial synchronism with elements being switched to the first state. Specifically, the manipulation of the phase and/or gain is achieved by applying a phase and/or gain offset to the reference signal, wherein the value of the phase and/or gain offset is determined in dependence upon the respective elements that are switched to the first state and the desired direction the beam is to be formed.

The antenna array 104 is operatively associated with the correlator 118 through insertion of the respective phase and/or gain offset within the correlator circuit. The operation of the correlator and the insertion of the phase and gain offsets are described in further detail below, with reference to FIG. 4.

In an embodiment, the value of the phase and/or gain offset is determined by retrieving a predetermined value stored in a database 120 that is accessible by the processor. An offset table, such as the table shown in the illustrative example below, is stored in the database 120 and selectively accessible by the processor 108. Although a stored database of predetermined offset values is the preferred method, it will be understood by those skilled in the art that in alternative embodiments, the phase and/or gain offsets are calculated in real time by the processor 108.

Antenna Elements

In the embodiment shown in FIG. 1, patch elements are depicted in a 3×3 array. However, it will be understood by those skilled in the art that in other embodiments, monopoles, dipoles or other suitable antenna elements are utilised. It will be further understood that the disclosure herein applies equally to antenna elements deployed in antenna arrays having multiple dimensions. In fact, in many practical applications, antenna elements are spatially distributed in a three-dimensional shape.

Throughout this specification and in the claims, the "first" state refers to when an element is active and the "second" state refers to when an element is inactive. The actual implementation of the inactive state varies depending on the type of element used, with the focus placed on making elements non-resonant to mitigate the effects of parasitics or mutual-coupling. For example, a $\frac{1}{4}\lambda$ monopole element is switched to open in the second state while a patch element is switched to ground in the second state. In some embodiments, the switches also provide a connection to a resistance, such as 50Ω in the second state. It will be appreciated by those skilled in the art that switching to other conditions, such as reactive loads, are also possible in the second state.

Beam Forming Slots

In the preferred embodiment, only one element 106 at a time is in the first state during the predetermined integration period, while all other elements are in the second state. That is, for each beam formed, only one element 106 is able to receive the incoming signal at any instant within the integration period. Each element 106 is switched to the first state for a so-called sub-integration period, which is less than the predetermined integration period. In one embodiment, these sub-integration periods are known as "beam forming slots" (B-slots).

Figure 2:
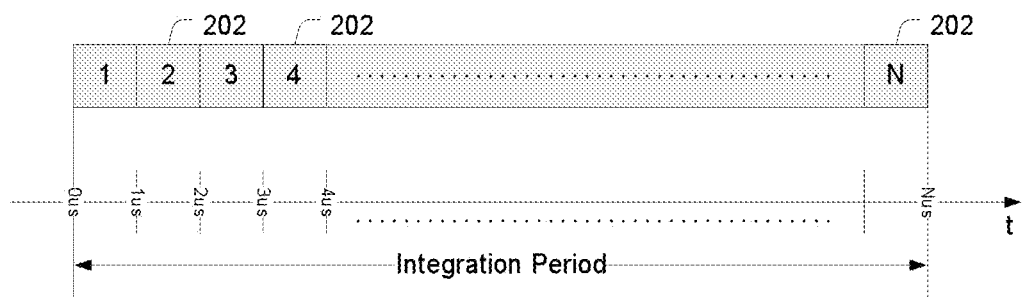
FIG. 2 is a timing diagram showing the relationship between B-slots and the integration period.

The relationship between B-slots and the integration period is best shown in FIG. 2. In the example of FIG. 2, B-slots 202 are each 1 µs in length and the integration period is Nµs long. In essence, the length of the integration period is simply divided into a number of equal length B-slots. A B-slot is therefore simply a period of time, during which the associated element that is switched to the first state receives an incoming positioning signal.

In one embodiment, elements 106 are dynamically assigned to a B-slot. In certain applications, such as brightside scan mode operation discussed below, only a subset of elements on an antenna array are required to form a beam. This can be achieved by setting the unwanted elements to remain switched to the second state for the entire duration of the integration period, so signals are not received from those elements and are therefore not accumulated. Alternatively, the length of the B-slots can be extended so that only a subset of elements are allocated a B-slot, and therefore only signals received from that subset of elements is accumulated.

However, in another embodiment, the minimum number of required B-slots corresponds to the number of elements 106 that are spatially distributed on the antenna array 104. For example, in an implementation where the antenna array only includes two elements, the minimum number of required B-slots is two. Each element 106 is switched to the first state for the entire duration of its allocated B-slot.

In a further embodiment, ten elements are spatially distributed in an antenna array and ten B-slots are provided, one for each element. Using an integration period of 1000 μs, which is a typical integration period of a standard GPS receiver, elements are switched to the first state for a period of 100 μs each, in a predetermined manner (such as sequentially or pseudo randomly). When the first element is switched to the first state, the processor also determines the phase and/or gain offset that needs to be applied to the reference signal, corresponding to the first element's position within the array and the direction of the beam required by the positioning receiver, and applies the offsets to the reference signal for the entire duration of the first allocated B-slot. In the subsequent 100 μs B-slot, the second element is switched to the first state while the first element and all the other elements are switched to their second states. Again, the processor determines the phase and/or gain offset corresponding to the second element's position within the array and the direction of the beam required by the positioning receiver, and applies that phase and/or gain offset for the entire duration of the second B-slot. In this example, which uses a sequential switching scheme, the third element is switched to the first state in the third B-slot while the other elements are switched to their second states, and so on for the subsequent B-slots within that integration period. At the completion of the 1000 μs integration period, all ten 100 μs B-slots will be accumulated with the requisite phase and/or gain offsets to produce the desired beam required by the positioning receiver.

Individual elements 106 in the antenna array 104 can only access the receiver when switched to the first state. Since the direction of the beam to be formed is known a priori, it follows that the elements must be switched to the first state in substantial synchronisation with the appropriate manipulation of the phase and/or gain of the reference signal in order for the beam to be formed in the desired direction. Also, in order to obtain the full benefit of the allocated B-slot, it follows that the phase and/or gain manipulation must be applied to the reference signal throughout the entirety of the allocated B-slot.

Beam Forming Methodology

Figure 3:
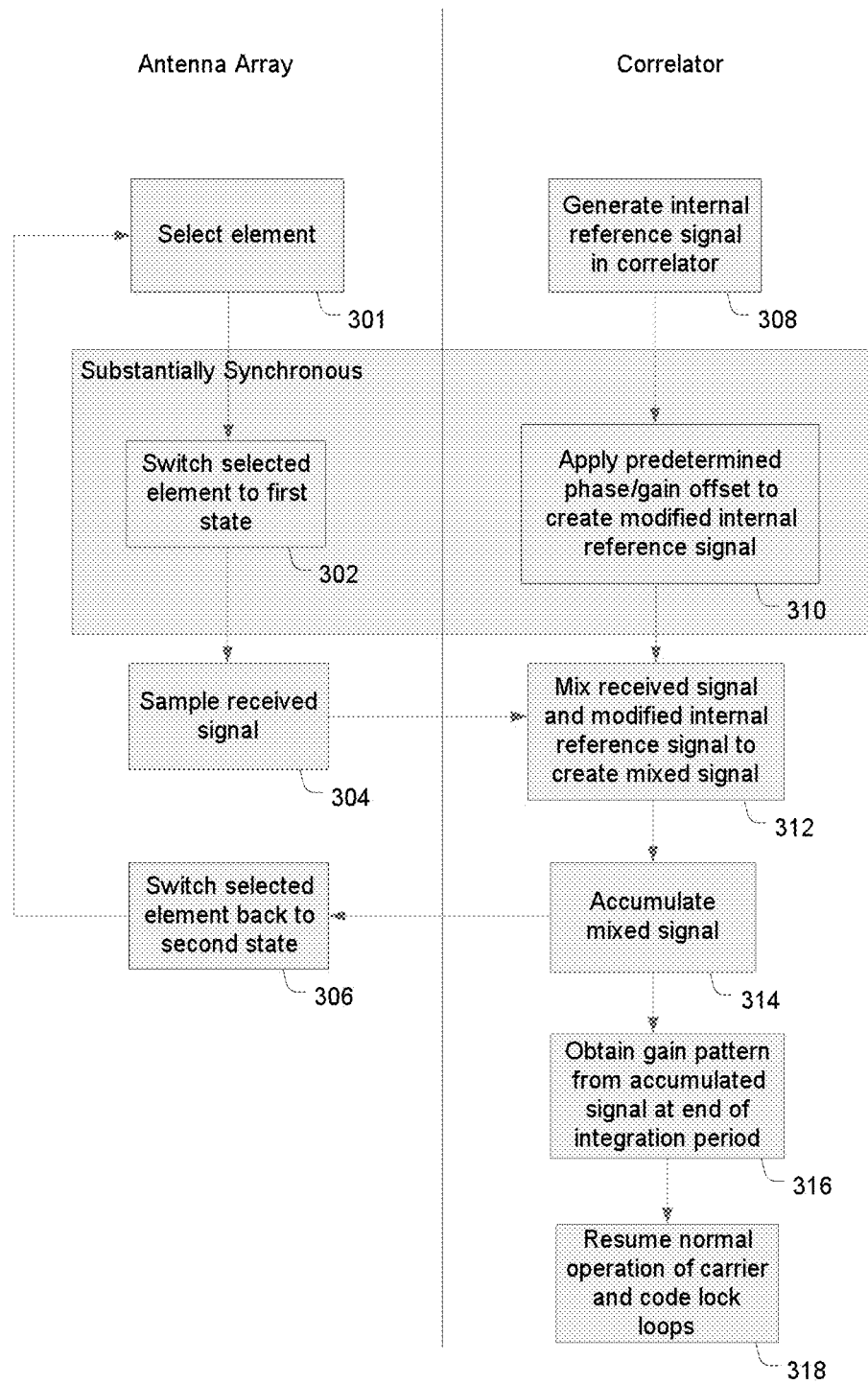
FIG. 3 is a flow diagram of the steps involved for forming beams according to one aspect of the invention.

The steps followed to form beams using the device disclosed herein are graphically represented in the flow diagram of FIG. 3. A description of the steps taken is provided below.

a) At step 301, one of the spatially distributed elements in the antenna array is selected and switched to the first state for the first B-slot.
b) At step 302, the element switched to the first state at step 301 receives an incoming signal.
c) At step 304, the incoming signal is sampled at the RF front end of the antenna array.
d) At step 308, an internal reference signal is generated in the correlator for mixing with the incoming signal.
e) At step 310, a predetermined offset is applied to the reference signal, in substantial synchronisation with step 302, to create a modified reference signal.
f) At step 312, the modified reference signal is mixed with the received signal to create a mixed signal.
g) At step 314, the mixed signal is accumulated in the accumulators to create an accumulated signal.
h) At step 306, the selected element is switched to the second state, the next element is switched to the first state in the next B-slot and the process starts again from step 301.
i) At step 316, after accumulating all the B-slots together at the end of the integration period, a beam is formed in the accumulators based on the value of all the B-slot signals.
j) At step 318, the carrier and code lock loops are updated using the accumulated B-slot signals.

Correlator Operation

A GPS position receiver typically uses a logic block called a correlator to correlate an incoming positioning signal with internally generated reference signals. Referring to FIG. 4, in the correlator 118, an incoming positioning signal is mixed with two internally generated reference signals. The first reference signal is a carrier reference signal that is generated by the carrier NCO 408. Mixing the carrier reference signal with the incoming positioning signal generates an error signal representing a phase and frequency difference between the carrier reference signal and the incoming signal. The second reference signal is a code reference signal that, in this embodiment, is generated by the code NCO 416. Once the incoming positioning signal has been mixed with the carrier reference signal, the incoming positioning signal is mixed with the code reference signal, which generates an error signal representing the time delay between the code reference signal and the incoming positioning signal.

For simplicity, FIG. 4 only shows a single receive channel of a positioning receiver. However, those skilled in the art will appreciate that modern receivers typically include more than a single receive channel, with each channel typically including more than one correlator.

In FIG. 4, the incoming positioning signal is received at the input 402 and stripped of the carrier component by mixing, in mixers 404 and 406, the incoming signal with a reference carrier signal to produce in-phase (I) and quadraphase (Q) sampled data. The reference carrier signal is synthesised in the carrier NCO 408 and the discrete sine and cosine mapping functions 410 and 412 respectively. This stripping process produces I and Q signals as shown. In operation, the carrier NCO is controlled by the carrier lock loop 414. The objective of the carrier lock loop is to keep the phase error between the reference signal and incoming positional signal at, or as close as possible to, zero. When the phase error is zero, the signals are said to be "phase-locked" and the I signals are at a maximum while the Q signals are nearly zero. This operation is also called "phase lock loop" (PLL) operation.

The I and Q signals are then correlated with a reference code signal that, in this embodiment, is synthesised in the code NCO 416. For the sake of simplicity, only one reference code signal is synthesised in this embodiment. However, those skilled in the art will recognise that in most positioning receivers, more than one code reference signal is synthesised. For example, in one application, three code reference signals—early, prompt and late signals—are synthesised and separately correlated with the I and Q signals respectively.

The correlator 118 mixes an internally synthesised code reference signal with the incoming I and Q signals in the mixers 418 and 420. In operation, the code NCO 416 is controlled by the code lock loop 426. The objective of the code lock loop is to keep the time error between the internally generated code reference signal and incoming code positioning signal at, or as close as possible to, zero. When the time error is zero, the signals are said to be "code-locked". This operation is also called "delay lock loop" (DLL) operation.

That is, the operation of the code lock loop 426 is similar to the carrier lock loop 414. When the reference signal code phase is completely aligned with the incoming positioning signal code phase, maximum correlation is attained.

The resultant mixed signals are then integrated in the accumulators 422 and 424 over an integration period, providing $I_p$ and $Q_p$ signals, which are subsequently accessed by the processor for tracking loop operation.

The integration period refers to the length of time over which the received signal is accumulated, and is traditionally determined based on a satellite's pseudorandom code noise length or multiples thereof. In GPS, this code period is 1 ms, and thus the integration period in the receiver is also often set to 1 ms or more.

Phase and/or Gain Offsets

In a preferred embodiment, phase and/or gain offsets for manipulating the phase and/or gain of the incoming positioning signal, is inserted at point 428, after the carrier reference signal is synthesised by the carrier NCO 408 and before the synthesised carrier reference signal is mixed with the carrier component of the incoming positioning signal, completing the carrier lock loop 414. In this preferred embodiment the phase offsets are summed with the reference signal, and the gain offsets are multiplied with the reference signal. Manipulation of the incoming positioning signal is achieved by modifying the synthesised carrier reference signal within the integration period of the correlator, therefore not interfering with the normal operation of the carrier NCO 408 or the carrier lock loop 414. The modified reference signal is then mixed with the incoming positioning signal in the usual manner, and the mixed signal is integrated in the accumulator over the integration period to create an accumulated signal.

As known by those skilled in the art, the integration of a waveform is simply the summation of samples of that waveform over a given period of time, in this case, the integration period. Therefore, the integration of the resultant mixed signal (resulting from mixing the incoming signal and the reference signal) is simply the summation of samples of that signal over a period of time—which in one of the embodiments described above is the integration period of 1 ms.

In one embodiment, the incoming positioning signal is sampled at a rate of 75 MHz via an RF-frontend and the samples are then mixed with a modified reference signal, which is also synthesised at 75 MHz. Consequently, for a hypothetical system in which the integration period is 1 ms comprised of 10 B-slots, each B-slot is of 100 μs in duration and therefore contains 7,500 samples of the incoming positioning signal. Each one of these 7,500 samples is sequentially mixed with a modified reference signal to form a mixed signal. The modified reference signal is based on a phase and/or gain offset applied to a reference signal, the reference signal being generated by the carrier NCO of the correlator. Specifically, for each block of 7,500 samples of the incoming positioning signal, which are synchronized with antenna elements being in the first state, the reference signal is modified by applying a phase and/or gain offset to the output of the carrier NCO. This modified output is then multiplied (mixed) with the incoming positioning signal samples. These mixed signals are then passed through the code NCO mixers, as per normal correlator operation, and then summed in the accumulators to form an accumulated signal. Therefore over the entire integration period of 1 ms, 75,000 samples, incorporating 10 B-slot blocks of 7,500 modified samples each, are summed and stored in the accumulators. In other words, these ten B-slots contain 7,500 modified samples each of which are summed together in the accumulation process, and the 75,000 accumulated samples at the end of the integration period are therefore representative of the desired beam.

Once the phase and/or gain manipulations are correctly applied to the reference signals and mixed with the signals received from the respective elements, the resultant mixed signal is then combined in the accumulator (the summing process) to create an accumulated signal, forming the desired beam in the correlator. This accumulated signal is then processed in the correlator as per normal PLL operation as discussed above. The carrier reference signal synthesised by the carrier NCO 408 does not change during the integration period, but is only updated by the carrier lock loop 414 at the end of each integration period. Therefore, modifications to the reference signal within the integration period cannot be detected by the PLL or the DLL. The PLL and DLL operate as per normal, unaware of the manipulations taking place.

Through the embodiments described, the use of a conventional correlator is adaptable to control the direction and the width of a unique beam per correlator channel, thereby allowing multiple simultaneous beams to be formed. The number of beams able to be formed is equal to the number of correlator channels available. This is because the correlator already contains logic for mixing and integrating signals—these are simply adapted for a use other than correlating.

Although the embodiments described above apply offsets to both the gain and the phase at point 428 in the correlator circuit, in other embodiments, additional multipliers for applying gain offsets are provided in other parts of the circuit. For example, multipliers can be added in the In-phase and Quadra-phase paths between the carrier NCO mixers and the code NCO mixers to provide gain manipulation. Similarly, phase offsets can also be applied at other parts in the correlator circuit. For example, phase offsets can be added to the output of the code NCO.

In the preferred embodiment, the phase and/or gain offsets for forming the beam in any given direction are predetermined, and stored in the database 120 and is accessible by the processor 108. The format of the offset data can take many forms, such as an offset table. The processor 108 determines the direction of the required beam, accesses the database 120 to obtain the correct phase and/or gain offsets for each element in each B-slot over the integration period to form the beam in the desired direction, and inserts the necessary offsets at point 428 such that the beam (122 in FIG. 1) is formed in the direction of the appropriate incoming positioning signal. As also noted, obtaining and inserting the phase and/or gain offsets must be substantially synchronous with the switching of the respective elements into the first state so that the phase and/or gain is correctly manipulated over the integration period.

In one embodiment, an antenna array has 128 elements. Therefore, each direction has 128 phase and 128 gain entries in the offset table. If, for example, it is necessary for the beam to point north, the processor looks up the table entry for north and steps through each of the 128 phase and 128 gain entries for that direction over the integration period to steer the beam north. In this embodiment, it is possible to steer the beam in 2048 directions, with each direction having 128 phase and 128 gain entries. Of course, in other embodiments, even more directions are implemented. For this reason, it is preferable to implement the phase and/or gain offset values in a tabular format, to alleviate processing overhead.

The embodiment noted in the above paragraphs is preferred because it minimises the processing power required. However, those skilled in the art will recognise that, especially given recent advances in microprocessor technology, the processor 108 is configurable to calculate the phase and/or gain offsets as and when the offsets are required.

In a physical implementation of the present invention, each element is connected by a transmission line 124 to a respective switch, which in turn feeds into a single RF frontend 126 to be downconverted and sent to at least one correlator. It should be noted that, in a preferred embodiment, the transmission line interconnecting the elements and the switches are of equal length, to ensure received signals are phase coherent through the antenna array feed system. However, in other embodiments, differences in the lengths of the transmission line are taken into account and corrected at the time of applying the phase and/or gain offsets.

The interconnection between the antenna array 104 and the receive channel 116, as well as the RF frontend 126, the electronics involved in the correlator 118 and the actual switches 110 themselves, will inevitably cause delays. In one embodiment, this delay is measured to be around 950 ns, but of course, those skilled in the art will appreciate that the length of the delay will vary depending on the selected hardware. Therefore, operation of the phase and/or gain manipulation in the correlator cannot occur simultaneously with the switching of the element to the first state, as this delay must be accounted for. That is, the manipulation of the phase and/or gain in the correlator must be delayed by up to 950 ns in this embodiment.

In other embodiments, each antenna array contains over 60 elements with an integration period in the region of 100 μs. In such embodiments, the period of a B-slot is in the region of just 1 μs or 2 μs. Therefore, a delay of 950 ns—nearly 1 μs—is significant and must be accounted for.

The number of elements that the antenna array contains is one criterion for forming narrow beams. Other, equally important criteria include resolution of the offset table and the physical spacing of the elements. For each direction, each element must have associated offsets for phase and/or gain. For example, in embodiments having 60 elements, table entries for each direction in which a beam is to be formed must have 60 gain offsets and 60 phase offsets recorded.

The physical separation of the elements is also important so as to create a phase difference between the elements. Effectively, the physical separation of the elements allows a positioning signal to be received with inherently different phases. One half wavelength separation between elements provides maximum phasing with minimum grating lobes. Manipulation of those phases, for example by mixing with a modified reference signal as noted above, allows for a beam to be formed in a desired direction.

In a particularly preferred embodiment, the elements 106 are spatially distributed in a configuration that is more than two dimensions such that the device can form beams in more than two dimensions. To a large extent, the directions in which a beam can possibly be formed are dependent on the elements used. For example, a planar array consisting of patch elements will be able to form beams hemispherically and a planar array consisting of monopoles will be able to form beams in a plane.

Bright-Side Scan Mode v Full-Scan Mode

It follows from the above discussion that at least two planar arrays consisting of patch elements can be arranged so that the hemispherical beams are joined to form beams spherically. In this arrangement, therefore, beams can be formed in any direction.

In full-scan mode, all elements are switched between first and second states at least once within the integration period. That is, all the elements in the array receive incoming signals at least once within each integration period. Full scan mode-provides total flexibility in that beams can be formed in many different directions simultaneously, dependant on how many correlator channels are available.

However, when signals only illuminate one side of a three dimensional antenna array, termed the "bright-side", the information received from the other side of the antenna array, termed the "dark-side", will potentially be of little value. This situation occurs frequently in terrestrial positioning systems, where transmitters are commonly distributed on the horizon. In this case, dark-side elements are blanked (that is, the gain on these elements are set to zero) and only bright-side elements are used. This effectively reduces the correlation duty cycle of the array by 50%, meaning that half of the correlation gain of the antenna array is wasted. For a positioning system spanning a relatively small area, this loss of correlation gain from the antenna can be tolerated, since the signal power of the transmitted signals is relatively high. Therefore, full-scan mode is preferred as in small area systems it is acceptable to trade-off maximum correlation gain for optimum flexibility.

However, for larger geographical areas, where signals are transmitted over greater distances, correlation gain may become increasingly important. In such instances, one way to increase the correlation gain of the antenna is to operate in bright-side scan mode. In this mode, elements on the bright-side are dynamically grouped together and their respective B-slot durations increased, such that only the bright side elements are accumulated within the integration period. This results in an increase in correlation duty cycle and therefore an overall increase in correlation gain.

An Illustrative Embodiment

Figure 5A:
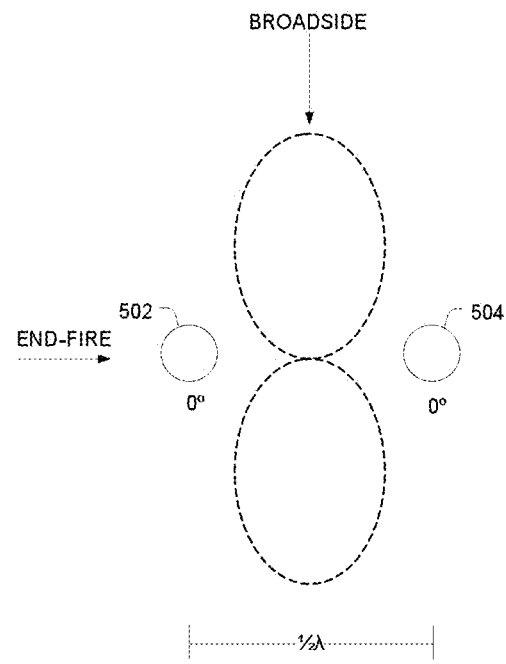
FIGS. 5a and 5b are schematic views of a two-antenna array according to one aspect of the invention.
Figure 5B:
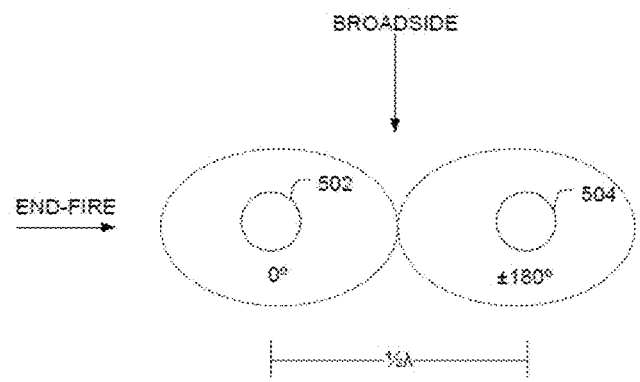

For illustrative purposes, the invention will now be described using the simplest antenna array—an array having only two elements as shown in FIGS. 5*a* and 5*b*. However, those skilled in the art would be able to adapt the teachings herein to antenna arrays having many more elements spatially distributed in multi-dimensional shapes without additional inventive faculty.

In this illustrative embodiment, elements 502 and 504 are quarter wavelength mono poles. The two elements are placed a half wavelength spatially apart from each other and signals are received at each element. When the two elements are summed together, the respective omni-directional gain patterns of the elements combine such that, from a two dimensional top view of the elements, a figure-8 beam pattern is formed, as shown in FIG. 5a. In this configuration, an incoming positioning signal from the broadside direction of the elements 502 and 504 are in-phase, and hence magnified, while signals from the end-fire direction of the elements are out of phase, and hence cancelled.

Phase Manipulation

In the present invention, it is possible to rotate the figure-8 by 90° so that maximum gain is pointed in the end-fire direction, as shown in FIG. 5b. This is achieved by manipulating the phase and/or gain of element 502 and element 504 within an integration period of a position receiver. Element 502 and element 504 are each connected to a switch, so that either element can be switched between first and second states and the integration period over which the summation of the signal occurs is split into two B-slots.

Since the phase separation between elements 502 and 504 is known, the phase of one of the elements can be manipulated so that incoming waves from the end-fire direction are summed constructively instead of destructively. In this case, because the elements are half wavelength apart, the phase manipulation required at element 504 is 180°. The phase manipulations required for each direction is similarly calculated to construct an offset table. For the sake of simplicity, the gain offset is set at 1 and the direction that the beam can be steered is limited to either the broadside direction or the end-fire direction. An example offset table incorporating these limitations is provided below.

| Direction | Broadside | | End-fire | |
| --- | --- | --- | --- | --- |
| Element | E502 | E504 | E502 | E504 |
| Phase | 0° | 0° | 0° | 180° |
| Gain | 1 | 1 | 1 | 1 |

To form a beam in the end-fire direction, elements 502 and 504 are switched to the first state in a predetermined B-slot sequence within the integration period of the position receiver. In the first B-slot, element 502 is switched to the first state and the phase offset is kept at 0° while being accumulated in the accumulator—no manipulations are necessary because this element is already at 0°. In the second B-slot, the phase of the incoming signal is desired to sum constructively at element 504. Since element 504 has a receive phase of 180° relative to element 502, a phase offset of 180° must be added to element 504, while being accumulated in the accumulator, so that the received signal from element 504 becomes phase coherent with element 502. The two B-slots are therefore summed together in the accumulation process and the accumulated value at the end of the integration period is therefore representative of the end-fire beam.

It will be understood by those skilled in the art that in the present invention, the figure-8 beam can be formed in any direction, depending on the complexity of offset table.

For both elements in this simple example, a gain offset of 1 (unity gain) is multiplied with the incoming positioning signal and therefore does not modify the beam formed.

As noted above, the phase manipulation must be applied substantially synchronously to the switching of the elements to the first state; otherwise the gain pattern of the beam will not be formed correctly.

According to embodiments of the present invention, a positioning signal from, for example PRN1, commences transmission. After acquisition of PRN1 at the positioning receiver, a carrier NCO within the positioning receiver correlator synthesises a reference signal that is substantially similar to the positioning signal.

The positioning receiver determined that PRN1 is in the end fire direction, and therefore a decision is made to form a beam in that direction. The processor looks up the offset table, and determines that no offset is required for the first B-slot during the integration period, which corresponds to element 502. Similarly, the processor determines that a 180°, or ½λ, offset is required during the second B-slot, which corresponds to element 504. After applying each offset to the carrier NCO to create a modified reference signal, the incoming positioning signal and the modified reference signal are mixed in a mixer and accumulated in the accumulator, as per the normal operation of a correlator. That is, with reference to FIGS. 1, 3 and 5, the incoming positioning signal received at elements 502 and 504 is fed via switches into the RF frontend 126 and subsequently down converted and sampled in an analogue to digital converter. The received signal is then passed to at least one correlator 118.

The received positioning signal is stripped into its' in-phase and quadra-phase components, by mixing the received positioning signal with a carrier reference signal that is synthesised by the carrier NCO 408 and the discrete sine and cosine mapping functions 410 and 412. Before the modified reference signal is mixed with the received positioning signal, however, the processor determines that PRN1 is in the endfire direction. For the first B-slot, in which element 502 is switched to the first state, the processor checks the table to determine if an offset to the carrier NCO is required. In this case, an offset is not required and so no modifications to the reference signal are necessary. The accumulation is therefore allowed to proceed as per normal correlator operation. That is, the unmodified reference signal is mixed with the received positioning signal in mixers 404 and 406 to create a mixed signal, then mixed with the code reference signal, and subsequently accumulated in the accumulators 422 and 424.

For the second B-slot, the processor checks the table to determine whether an offset to the carrier NCO is required. In this case, a phase offset of 180° is required. The offset is applied to the current carrier reference signal phase value to create a modified reference signal as the second B-slot begins and element 504 is switched to the first state. The phase offset is applied continually to the carrier NCO value throughout the duration of the B-slot. The modified reference signal is mixed with the received positioning signal to create a mixed signal, then mixed with the code reference signal, and subsequently accumulated with the value of the first B-slot in the accumulators 422 and 424 to create an accumulated signal. The two B-slots are therefore summed together in the accumulation process and the accumulated value at the end of the integration period is therefore representative of the end-fire beam.

Note that the carrier reference signal synthesised by the carrier NCO 408 does not change during the integration period, but is only updated by the carrier lock loop 414 at the end of the integration period.

In embodiments discussed herein, the accumulated signal is created in the accumulator over the entire duration of the integration period. However, in other embodiments, each B-slot is accumulated in its' own individual accumulator, the minimum number of accumulators corresponding to the minimum number of B-slots required. In these embodiments, the accumulated signal is obtained from combining the signals in the individual accumulators.

In the embodiments discussed, only one element can be in the first state at any instant within the integration period. Therefore, when element 504 is switched to the first state, element 502 is simultaneously switched to the second state.

After traversing the code lock loop 426, the mixed signal is integrated in the accumulators 422 and 424, creating an accumulated signal. Since the manipulation to the signals occurs serially, the integration of the mixed signal is, in effect, the summation of an infinite number of modified signals over the integration period. Therefore, the accumulated signal is representative of a new beam formed in the desired direction.

As described above, the antenna array 104 and switching circuit (switches 110) are coupled to a positioning receiver 114, which performs the required PVT solution to determine the position of the receiver. Since the direction of incoming positioning signals are known for any given time, the beams formed in each correlator channel can be directed towards those known directions to maximise the gain of the incoming signal while attenuating signals from other directions, therefore mitigating the effects of multipath.

Although the invention has been described with reference to specific examples, it will be appreciated by those skilled in the art that the invention may be embodied in many other forms.

In the claims below and the description herein, any one of the terms "comprising", "comprised of", or "which comprises" is an open term that means including at least the elements/features that follow, but not excluding others. Thus, the term "comprising", when used in the claims, should not be interpreted as being limitative to the means or elements or steps listed thereafter. For example, the scope of the expression a device comprising A and B should not be limited to devices consisting only of elements A and B. Any one of the terms "including", "which includes", or "that includes" as used herein is also an open term that also means including at least the elements/features that follow the term, but not excluding others. Thus, "including" is synonymous with and means the same as "comprising".

The invention claimed is:

1. A device for mitigating multipath at a receiver, said device including:
   an antenna array having a plurality of spatially distributed elements;
   a processor for selectively switching said elements between first and second states, wherein said elements are configured to receive an incoming signal in said first state and configured to not receive an incoming signal in said second state; and
   a receiver operatively associated with said antenna array and said processor, said receiver configured to: generate a reference signal; modify said reference signal in substantial synchronisation with said elements being switched to said first state; mix said incoming signal with the modified reference signal to generate a mixed signal; and sum said mixed signal over an integration period to generate an accumulated signal, such that said accumulated signal is indicative of the direction and magnitude of said beam of said antenna array, wherein the modifications applied to said reference signal are selected to form said beam in the known direction of a source of said incoming signal.

2. A device according to claim 1, wherein said receiver includes at least one receive channel having a correlator configured to generate said reference signal.

3. A device according to claim 1, wherein the modification of said reference signal comprises selective manipulation of the phase and/or gain of said reference signal.

4. A device according to claim 3, wherein said manipulation of said phase and/or gain comprises application of a phase and/or gain offset to said reference signal, wherein the value of said phase and/or gain offset is determined in dependence upon one of said elements being switched to said first state.

5. A device according to claim 2, wherein said correlator includes a carrier numerically controlled oscillator (NCO) configured to synthesise said reference signal.

6. A device according to claim 4, wherein said processor is configured to determine the value of said phase and/or gain offset in real time or by retrieving a predetermined value stored in a database that is accessible by said processor.

7. A device according to claim 1, wherein said processor is configured to selectively switch any one or more of said elements between said first and second states in a predetermined sequence.

8. A device according to claim 7, wherein said predetermined sequence selectively excludes one or more of said elements from being switched to said first state.

9. A device according to claim 1, wherein said receiver includes multiple receive channels, each receive channel being adaptable to form at least one beam.

10. A device according to claim 1, wherein elements switched to said second state are configured to be non-resonant such that the effects of mutual-coupling are ameliorated.

11. A device according to claim 1, wherein said processor is configured to delay the modification of said reference signal to account for a propagation delay incurred between receiving said incoming signal and mixing said incoming signal, such that said substantial synchronisation is maintained.

12. A method for mitigating multipath at a receiver having an antenna array, said method including the steps of:
   a) selectively switching spatially distributed elements of said antenna array from a second state in which said elements are configured to not receive an incoming signal to a first state in which said elements are configured to receive an incoming signal;
   b) receiving, through said elements switched to said first state, a signal from a source in a known direction;
   c) generating a reference signal;
   d) modifying said reference signal in substantial synchronisation with said elements being switched to said first state to create a modified reference signal;
   e) mixing said incoming signal with said modified reference signal to create a mixed signal; and
   f) accumulating said mixed signal over an integration period to create an accumulated signal, wherein said accumulated signal is indicative of the direction and magnitude of said beam of said antenna array, and wherein the modifications applied to said reference signal are selected to form said beam in said known direction.

13. A method according to claim 12, wherein said reference signal is generated in a correlator.

14. A method according to claim 12, wherein modifying said reference signal comprises selectively manipulating the phase and/or gain of said reference signal.

15. A method according to claim 14, wherein selectively manipulating the phase and/or gain of said reference signal comprises applying a phase and/or gain offset to said reference signal, wherein the value of said phase and/or gain offset is determined in dependence upon one of said elements being switched to said first state.

16. A method according to claim 15, wherein the value of said phase and/or gain offset is determined in real time or by retrieving a predetermined value stored in a database.

17. A method according to claim 12, wherein any one or more of said elements are selectively switched between said first and second states in a predetermined sequence.

18. A method according to claim 17, wherein a subset of said elements remain switched to said second state for the entire duration of said integration period.

19. A method according to claim 13, wherein said correlator generates said reference signal in a carrier numerically controlled oscillator (NCO).

20. A method according to claim 12, wherein said receiver includes multiple receive channels, and wherein said method further comprises the step of adapting each receive channel to form at least one beam.

21. A method according to claim 12, wherein the modification of said reference signal is delayed to account for a propagation delay incurred between receiving said incoming signal and mixing said incoming signal, such that said substantial synchronisation is maintained.

* * * * *